United States Patent
Ni et al.

(10) Patent No.: US 11,263,931 B2
(45) Date of Patent: Mar. 1, 2022

(54) DISPLAY SUBSTRATE, FABRICATION METHOD THEREOF AND DISPLAY DEVICE

(71) Applicant: BOE Technology Group Co., Ltd., Beijing (CN)

(72) Inventors: Jingkai Ni, Beijing (CN); Weijie Wang, Beijing (CN); Wenqi Liu, Beijing (CN); Zhongyuan Sun, Beijing (CN); Xiaofen Wang, Beijing (CN); Xiang Zhou, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 85 days.

(21) Appl. No.: 16/887,841

(22) Filed: May 29, 2020

(65) Prior Publication Data
US 2021/0125527 A1    Apr. 29, 2021

(30) Foreign Application Priority Data

Oct. 28, 2019    (CN) .......................... 201911030773.3

(51) Int. Cl.
*G09F 9/30*    (2006.01)
*G06F 1/16*    (2006.01)

(52) U.S. Cl.
CPC ............ *G09F 9/301* (2013.01); *G06F 1/1647* (2013.01); *G06F 1/1652* (2013.01)

(58) Field of Classification Search
CPC .... G06F 1/1647; G06F 1/1652; G06F 1/1656; G09F 9/301; H04M 1/0268
See application file for complete search history.

(56) References Cited

U.S. PATENT DOCUMENTS

| 11,024,828 | B2 * | 6/2021 | Kim ..................... H01L 51/5253 |
| 2011/0298396 | A1 * | 12/2011 | Kimura ................ G09G 3/3233 |
| | | | 315/307 |

(Continued)

FOREIGN PATENT DOCUMENTS

| CN | 108461531 A | 8/2018 |
| CN | 109103346 A | 12/2018 |

(Continued)

OTHER PUBLICATIONS

First Office Action dated Feb. 22, 2021 corresponding to Chinese application No. 201911030773.3.

*Primary Examiner* — Joe H Cheng
(74) *Attorney, Agent, or Firm* — Nath, Goldberg & Meyer; Joshua B. Goldberg

(57) ABSTRACT

The present disclosure provides a display substrate including: a first flexible substrate; a second flexible substrate; and a bonding layer between the first flexible substrate and the second flexible substrate and bonding the first and second flexible substrates to each other; wherein the second flexible substrate includes a plurality of first support parts and a second support part spacing the plurality of first support parts apart from each other; a side of each first support part distal to the first flexible substrate is provided thereon with a display unit; the second support part includes a first part and a second part other than the first part, and a signal line configured to connect display units is disposed on a side of the first part distal to the first flexible substrate; and a thickness of the second part is smaller than a thickness of the first support part.

15 Claims, 4 Drawing Sheets

(56) References Cited

U.S. PATENT DOCUMENTS

2012/0146886 A1\* 6/2012 Minami .............. H01L 51/0097
  345/80
2013/0082984 A1\* 4/2013 Drzaic .................. H05K 1/189
  345/204

FOREIGN PATENT DOCUMENTS

| CN | 109683226 A | | 4/2019 |
|----|-------------|---|--------|
| CN | 109830506 A | | 5/2019 |
| CN | 109920334 A | | 6/2019 |
| CN | 110082945 A | \* | 8/2019 |
| CN | 110189640 A | \* | 8/2019 |
| CN | 110189640 A | | 8/2019 |
| CN | 110246868 A | | 9/2019 |
| KR | 102045927 B1 | | 11/2019 |

\* cited by examiner

DISPLAY SUBSTRATE, FABRICATION METHOD THEREOF AND DISPLAY DEVICE

CROSS-REFERENCE TO RELATED APPLICATION

This application claims priority to Chinese Patent Application No. 201911030773.3, filed on Oct. 28, 2019, the entire contents of which are hereby incorporated by reference.

TECHNICAL FIELD

The present disclosure relates to the field of display technology, and particularly, to a display substrate, a fabrication method thereof, and a display device.

BACKGROUND

Flexible display devices are increasingly becoming the first choice for wearable mobile display devices due to their characteristics such as bendability, foldability, capability of being rolled-up, and stretchability.

At present, in the process of manufacturing a flexible display device, damage or abnormity is easily caused to a display unit.

SUMMARY

In an aspect, the present disclosure provides a display substrate including:

a first flexible substrate;

a second flexible substrate;

a bonding layer between the first flexible substrate and the second flexible substrate and bonding the first flexible substrate and the second flexible substrate to each other;

wherein the second flexible substrate includes a plurality of first support parts and a second support part spacing the plurality of first support parts apart from each other;

a side of each of the plurality of first support parts distal to the first flexible substrate is provided thereon with a display unit;

the second support part includes a first part and a second part other than the first part;

a signal line configured to connect a plurality of display units is disposed on a side of the first part distal to the first flexible substrate; and a thickness of the second part is smaller than a thickness of the first support part.

In an embodiment, a thickness of the first part and the thickness of the second part are both smaller than the thickness of the first support part.

In an embodiment, a thickness of the first part is 9 μm to 11 μm, and the thickness of the second part is 1 μm to 2 μm.

In an embodiment, a plurality of through holes are provided in the second part of the second support part.

In an embodiment, the plurality of through holes are arranged in an array.

In an embodiment, in the second support part between two adjacent display units, the plurality of through holes are arranged in a first direction, each through hole extends in a second direction intersecting with the first direction, and the first direction is a direction along which the two adjacent display units are arranged.

In an embodiment, in the second support part between two adjacent display units, the plurality of through holes are arranged in a first direction, each through hole extends in a second direction intersecting with the first direction, and the second direction is a direction along which the two adjacent display units are arranged.

In an embodiment, the display unit includes a display area and a non-display area surrounding the display area; a retaining wall is disposed on the non-display area; a packaging layer is disposed on a side of the display unit and the second support part distal to the first flexible substrate; and the retaining wall is between the packaging layer and the display unit.

In an embodiment, the retaining wall is a continuous structure surrounding the display area.

In an embodiment, the packaging layer has a smaller thickness at a lower part of a side wall of the retaining wall than at other positions.

In an embodiment, a width of the retaining wall gradually decreases in a direction approaching the first flexible substrate.

In another aspect, the present disclosure provides a display device including the display substrate according to the embodiments of the present disclosure.

In another aspect, the present disclosure provides a method for fabricating a display substrate, including:

providing a first flexible substrate;

forming a bonding layer on the first flexible substrate;

forming a second flexible substrate on the bonding layer; wherein the second flexible substrate includes: a plurality of first support parts and a second support part spacing the plurality of first support parts apart from each other; and the second support part includes a first part and a second part other than the first part; a thickness of the second part being smaller than a thickness of the first support part;

forming a display unit on a side of each of the plurality of first support parts distal to the first flexible substrate, and forming a signal line configured to connect a plurality of display units on a side of the first part of the second support part distal to the first flexible substrate;

forming a protection layer on a side of the plurality of display units distal to the first flexible substrate;

applying pressure to the first flexible substrate and/or the protection layer to cause the second flexible substrate to be integrally bonded with the first flexible substrata, through the bonding layer; and removing the protection layer to obtain the display substrate.

In an embodiment, the method further includes:

forming, in the second part of the second support part, a plurality of through holes penetrating through the second part.

In an embodiment, the display unit includes a display area and a non-display area surrounding the display area; and the method further includes steps of:

forming a retaining wall on a side of the non-display area distal to the first flexible substrate, wherein the retaining wall is a continuous structure surrounding the display area; and forming a packaging layer on a side of the display area distal to the first flexible substrate, a side of the retaining wall distal to the first flexible substrate and a side of the second support part distal to the first flexible substrate, and making a thickness of the packaging layer at a lower part of a side wall of the retaining wall smaller than that a thickness of the packaging layer at other positions.

BRIEF DESCRIPTION OF THE DRAWINGS

The drawings are provided for further understanding of the present disclosure, constitute part of this specification, and serve to explain the present disclosure together with the following specific implementations, but are not intended to limit the present disclosure, in which.

DETAILED DESCRIPTION

Hereinafter, the specific implementations of the present disclosure will be described in details with reference to the drawings. It should be understood that the specific implementations described herein are merely for illustrating and explaining the present disclosure, rather than limiting the present disclosure.

Figure 1:
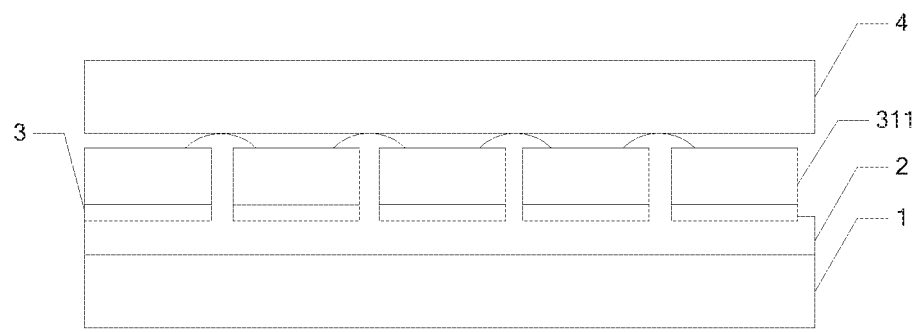
FIG. 1 is a cross-sectional view of a display substrate in the related art.
Figure 2:
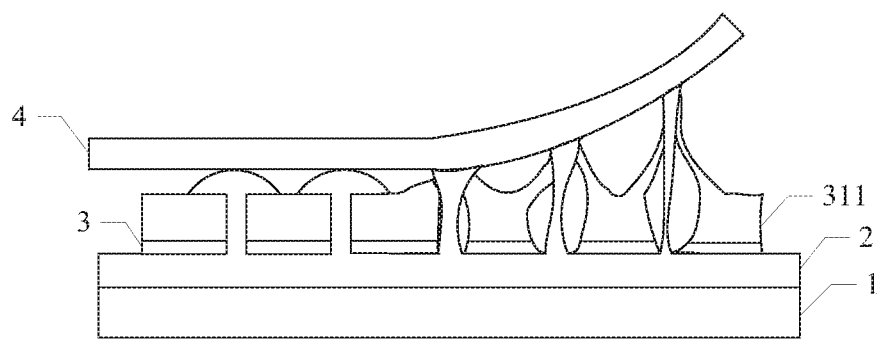
FIG. 2 is a schematic diagram of removing a protection layer in the related art.

FIG. 1 is a cross-sectional view of a display substrate in the related art. As shown in FIG. 1, the display substrate includes a first flexible substrate 1, a bonding layer 2 and a second flexible substrate 3 sequentially disposed on the first flexible substrate 1, and a display unit 311 disposed on a side of the second flexible substrate 3 distal to the first flexible substrate 1. In a fabricating process, the first flexible substrate 1 and the second flexible substrate 3 are bonded together by the bonding layer 2. In order to prevent damage to the display unit 311 caused by direct contact between the display unit 311 and a processing device, a protection layer 4 is usually disposed on a side of the display unit 311 distal to the first flexible substrate 1. In the related art, part, other than parts overlapping with the display unit 311 and a signal line 33, of the second flexible substrate 3 is etched away, and thus the bonding layer 2 may leak into a gap between the display unit 311 and the protection layer 4 in the fabricating process, so that the display unit 311 and the protection layer 4 are adhered to each other. FIG. 2 is a schematic diagram of removing a protection layer in the related art, and as shown in FIG. 2, because the display unit 311 is adhered to the protection layer 4, the display unit 311 is dragged during the process of removing the protection layer 4, and the display unit 311 is damaged.

Figure 3:
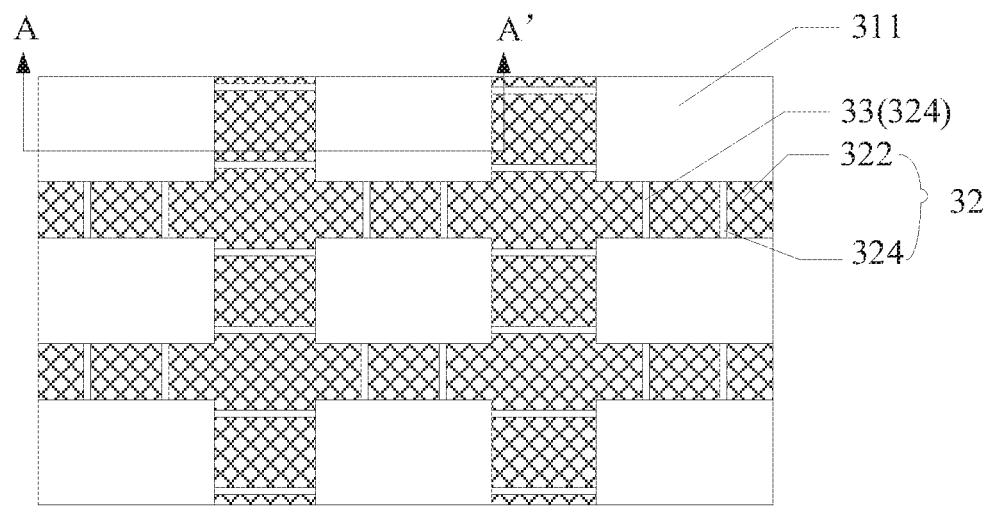
FIG. 3 is a schematic diagram of a display substrate according to an embodiment of the present disclosure.
Figure 4:
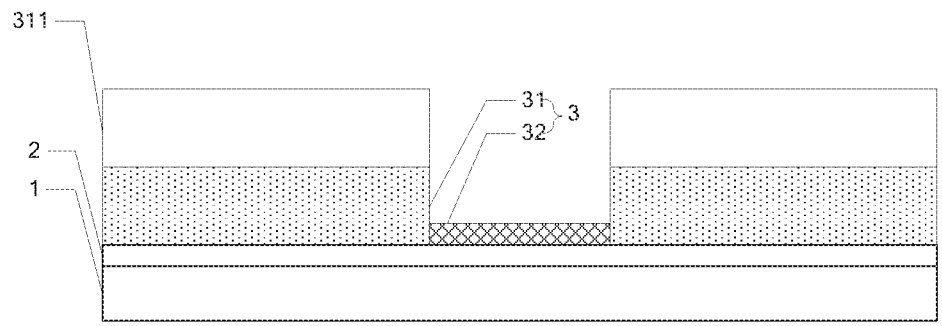
FIG. 4 is a cross-sectional view taken along line AA' of FIG. 3 according to an embodiment of the present disclosure.

An embodiment of the present disclosure provides a display substrate, FIG. 3 is a schematic diagram of a display substrate according to an embodiment of the present disclosure, and FIG. 4 is a cross-sectional view taken along line AA' of FIG. 3 according to the embodiment of the present disclosure. As shown in FIGS. 3 and 4, the display substrate includes: a first flexible substrate 1, a bonding layer 2 and a second flexible substrate 3 disposed on the first flexible substrate 1, and the bonding layer 2 is located between the first flexible substrate 1 and the second flexible substrate 3. The second flexible substrate 3 includes: a plurality of first support parts 31, and a second support part 32 spacing the plurality of first support parts 31 apart from each other, A display unit 311 is disposed on a side of the first support part 31 distal to the first flexible substrate 1. A signal line 33 for connecting a plurality of display units 311 is disposed on a side of the second support part 32 distal to the first flexible substrate 1. The thickness of at least part of the second support part 32 is smaller than that of the first support part 31.

In an embodiment, the first flexible substrate 1 and the second flexible substrate 3 may be highly elastic substrates, and the display unit 311 may be an organic light-emitting diode (OLED) display unit. The bonding layer 2 is configured to bond the first flexible substrate 1 and the second flexible substrate 3. Each first support part 31 is provided thereon with a display unit 311, and since the plurality of first support parts 31 are spaced apart by the second support part 32, signal lines 33 are disposed on a side of the second support part 32 distal to the first flexible substrate 1 to connect a plurality of display units 311 respectively disposed on the plurality of first support parts 31 to each other. In an embodiment, the display unit 311 may include a pixel structure to allow the display substrate to have a display function. The signal lines 33 may electrically connect the display units 311 to each other, so as to supply a common power supply voltage and/or ground voltage to the display units 311.

In an embodiment of the present disclosure, the thickness of only part of the second support part 32 may be smaller than the thickness of the first support part 31, and alternatively, the thickness of each part of the second support part 32 may be smaller than the thickness of the first support part 31, which is not limited herein. In an embodiment, the second support part 32 may include a first part 324 and a second part 322. In an embodiment, the first part 324 may be the part of the second support part 32 on which the signal lines 33 are disposed, and the second part 322 may be other part than the first part 324. In a case where the thickness of only part of the second support part 32 is smaller than the thickness of the first support part 31, the thickness of the second part 322 is smaller than the thickness of the first part 324, for example, the thickness of the first part 324 is set between 9 µm and 11 µm (e.g., 10 µm); the thickness of the second part 322 is set between 1 µm and 2 µm. In an embodiment, the thickness of the first part 324 may be equal to the thickness of the first support part 31. It could be understood that, in a case where the thickness of each part of the second support part 32 is smaller than the thickness of the first support part 31, the thicknesses of the first part 324 and the second part 322 of the second support part 32 may be set between 1 µm and 2 µm.

In the display substrate of the embodiments of the present disclosure, the part of the second flexible substrate 3 on which the display unit 311 and the signal line 33 are not disposed is not completely removed, so that the area of the bonding layer 2 shielded by the second flexible substrate 3 is increased, and the bonding layer 2 is prevented from leaking into the gap between the display unit 311 and the protection layer to bond the display unit 311 with the protection layer in the process. Meanwhile, since the thickness of at least part of the second support part 32 is smaller than that of the first support part 31, the stress concentration phenomenon generated on the second support part 32 during a stretching process is effectively improved, so that the display substrate provided by the embodiments of the present disclosure still has good stretching performance.

Figure 5A:
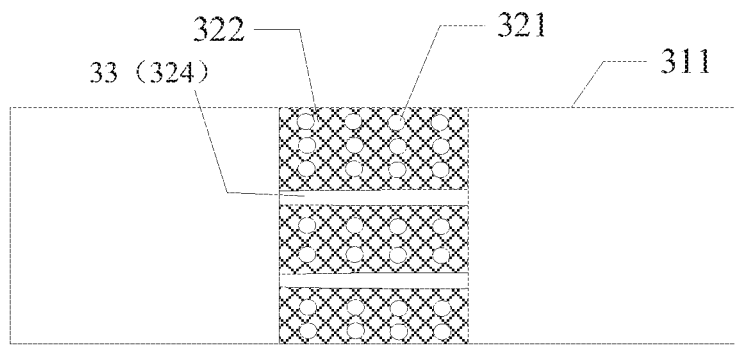
FIGS. 5a to 5c are schematic diagrams of providing through holes according to an embodiment of the present disclosure.
Figure 5B:
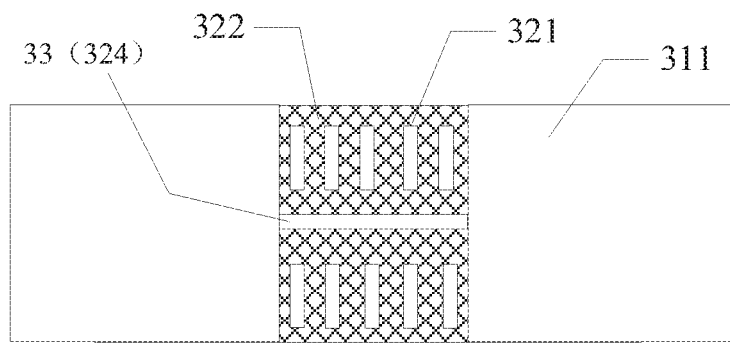
Figure 5C:
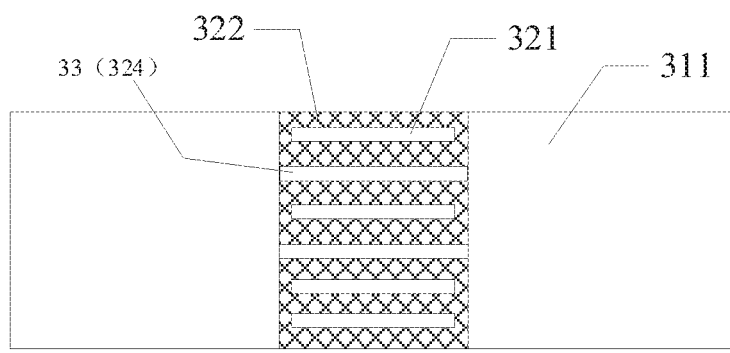

FIGS. 5a to 5c are schematic diagrams of providing through holes according to an embodiment of the present disclosure, and as shown in FIGS. 5a to 5c, in some embodiments, a plurality of through holes 321 are provided in the second support part 32, and the plurality of through holes 321 are in the second part 322. In an embodiment, the plurality of through holes 321 are arranged in an array; alternatively, the plurality of through holes 321 are arranged in a first direction, and each through hole 321 extends in a second direction intersecting with the first direction.

In an embodiment, the through holes 321 may be provided in various forms, for example, the through holes 321 may be arranged in an array (as shown in FIG. 5a), and the through holes 321 may be in the shape of a rectangle, a triangle, a circle, an ellipse, or other irregular patterns, which is not limited herein. The through holes 321 may also be arranged along a first direction and extend along a second direction intersecting with the first direction, for example, as shown in FIG. 5b, the first direction is a direction along which two adjacent display units 311 are arranged (or an extending direction of the signal line 33 connecting the two adjacent display units 311, e.g., a transverse direction as shown in FIG. 3), and the second direction is perpendicular to the first direction; alternatively, as shown in FIG. 5c, the second direction is the direction along which two adjacent display units 311 are arranged (or an extending direction of the signal line connecting the two adjacent display units 311, e.g., a transverse direction as shown in FIG. 3), and the first direction is perpendicular to the second direction. By providing the through holes 321 in the second support part 32 to expose part of the bonding layer 2, the stress concentration phenomenon generated on the second support part 32 during a stretching process is further improved, and the stretching performance of the display substrate is ensured.

Figure 6:
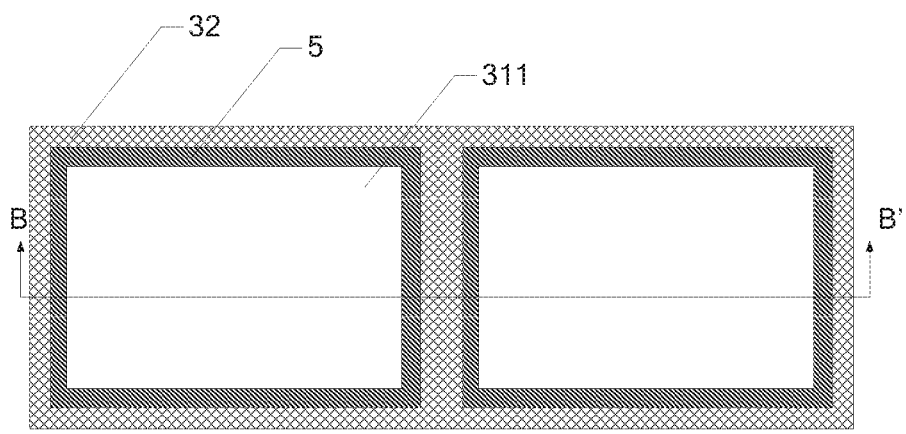
FIG. 6 is a schematic diagram of providing a retaining wall according to an embodiment of the present disclosure.
Figure 7:
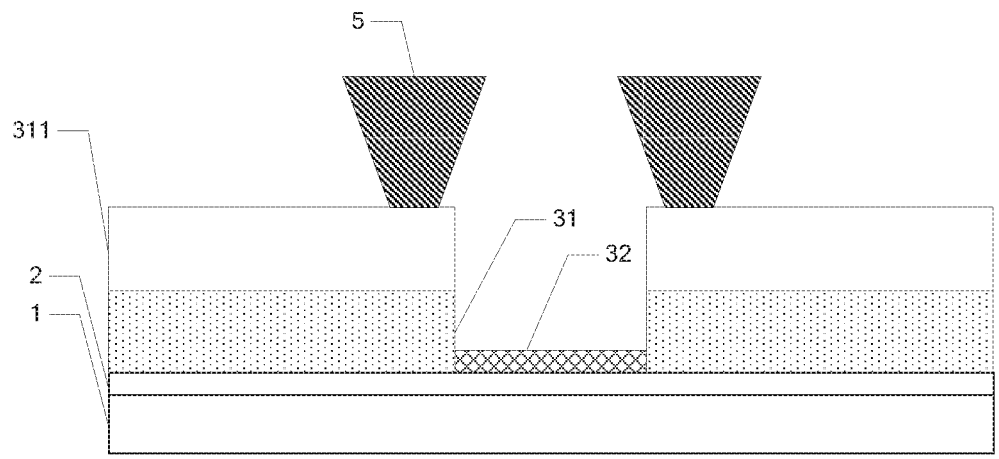
FIG. 7 is a cross-sectional view taken along line BB' of FIG. 6 according to an embodiment of the present disclosure.
Figure 8:
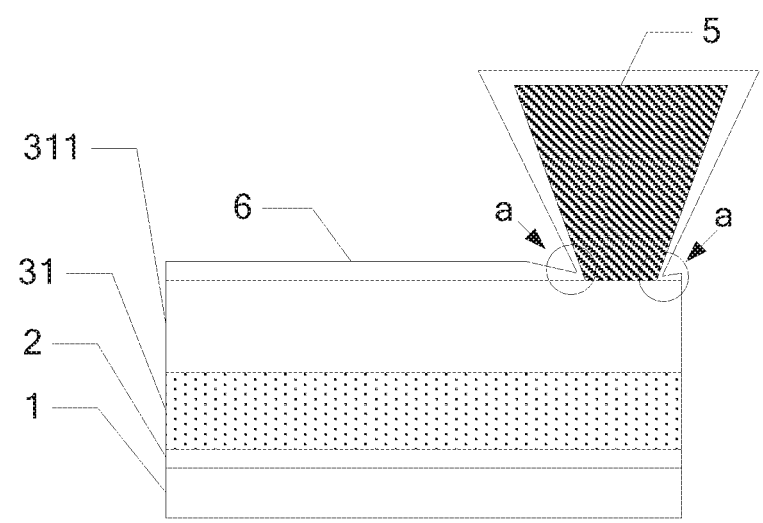
FIG. 8 is a schematic diagram of providing a packaging layer according to an embodiment of the present disclosure.

FIG. 6 is a schematic diagram of a retaining wall provided in an embodiment of the present disclosure, FIG. 7 is a cross-sectional view taken along Line BB' of FIG. 6 provided in the embodiment of the present disclosure, and FIG. 8 is a schematic diagram of a packaging layer provided in an embodiment of the present disclosure. As shown in FIGS. 6 to 8, the display unit 311 includes a display area and a non-display area surrounding the display area. A retaining wall 5 is disposed on a side of the non-display area distal to the first flexible substrate 1, A packaging layer 6 is disposed on a side of the display unit 311 and the second support part 32 distal to the first flexible substrate 1. The retaining wall 5 is located between the packaging layer 6 and the display unit 311.

For the display substrate in the related art, the packaging layer 6 may generate a crack during the stretching process, and the crack may spread into the display area of the display unit 311, which will allow water vapor to permeate along the crack, thereby causing a defect in a component in the display unit 311 and affecting the display effect of the display unit 311. However, in the embodiments of the present disclosure, the retaining wall 5 is disposed in the non-display area surrounding the display area of the display unit 311, and the crack of the packaging layer 6 can be prevented from spreading into the display area of the display unit 311. In an embodiment, the retaining wall 5 may be designed to allow the thickness of the packaging layer 6 at a specific position to be smaller than that at other positions. In an embodiment of the present disclosure, the packaging layer 6 may have a smaller thickness at the lower part of the side wall of the retaining wall 5 than at other positions. Further, the retaining wall 5 may be configured such that the width of the retaining wall 5 gradually decreases in a direction approaching the first flexible substrate 1, as shown in FIG. 7. It should be noted that, in the embodiments of the present disclosure, the width of the retaining wall 5 refers to a dimension of the retaining wall 5 from a side of the retaining wall 5 proximal to the second support part 32 to a side of the retaining wall 5 distal to the second support part 32. Due to the sharp reduction in thickness of the packaging layer 6 at the corner (position a in FIG. 8), a part of the packaging layer 6 at the corner (position a in FIG. 8) becomes the stress concentration point of the layer. When a part of the packaging layer 6 on the second support part 32 generates a crack during stretching, the packaging layer 6 at the position a will fracture when the crack extends to the position a, so that the extension of the crack is stopped at the position, and the crack is prevented from extending into the display area of the display unit 311.

In an embodiment of the present disclosure, a longitudinal section of the retaining wall 5 parallel to the width direction may be in the shape of an inverted trapezoid, or may also be in the shape of a pattern having a certain radian such as a circle or semicircle, as long as the retaining wall 5 has an inflection point and the thickness of the packaging layer 6 at the inflection point can be made smaller than the thickness of the packaging layer 6 at other positions, and the specific form is not limited herein.

As shown in FIG. 6, the retaining wall 5 may be a continuous structure surrounding the display area to prevent cracks in various directions from spreading into the display area of the display unit 311, and specifically, the continuous structure may be a continuous polygonal structure, which is not limited herein.

In another aspect, an embodiment of the present disclosure further provides a display device, which includes the display substrate as described above. The display device may be any product or component with a display function such as an electronic paper, an OLED panel, a mobile phone, a tablet computer, a television, a display, a notebook computer, a digital photo frame, a navigator, or the like.

Figure 9:
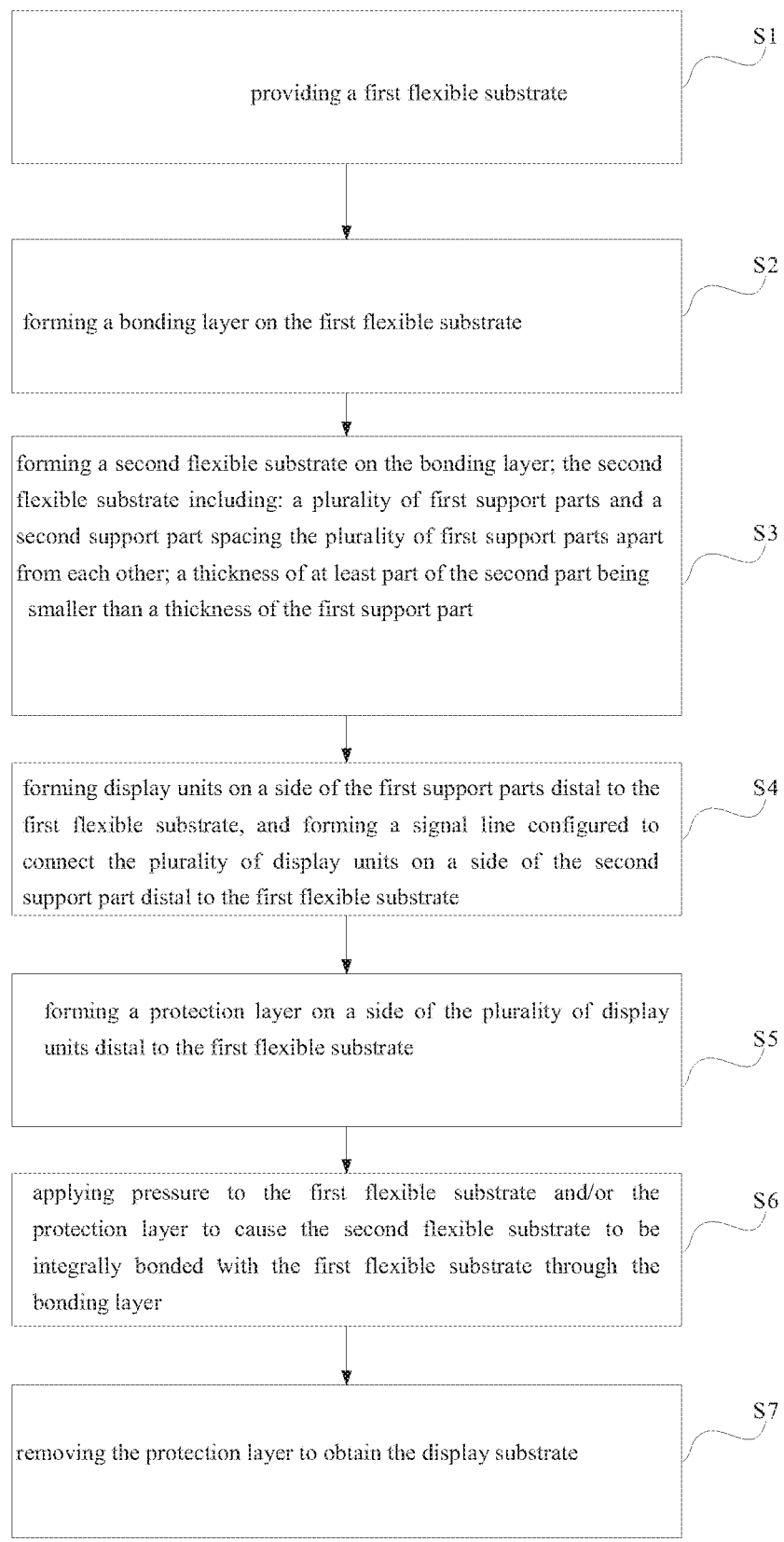
FIG. 9 is a flowchart of a fabrication method according to an embodiment of the present disclosure.

In another aspect, an embodiment of the present disclosure further provides a method for fabricating a display substrate, and FIG. 9 is a flowchart of a fabricating method according to an embodiment of the present disclosure. As shown in FIG. 9, the method includes the following steps.

At S1: a first flexible substrate is provided.

At S2, a bonding layer is formed on the first flexible substrate.

At S3, a second flexible substrate is formed on the bonding layer; the second flexible substrate includes; a plurality of first support parts and a second support part spacing the plurality of first support parts apart from each other; the thickness of at least part of the second support part is smaller than the thickness of the first support part.

At S4, a display unit is formed on a side of the first support part distal to the first flexible substrate, and a signal line for connecting a plurality of display units is formed on a side of the second support part distal to the first flexible substrate.

At S5, a protection layer is formed on a side of the plurality of display units distal to the first flexible substrate.

At S6, pressure is applied to the first flexible substrate and/or the protection layer to cause the second flexible substrate to be integrally bonded with the first flexible substrate through the bonding layer.

At S7, the protection layer is removed, thereby obtaining the display substrate.

It should be noted that, in an embodiment of the present disclosure, steps S1 to S5 may be performed on a carry sheet glass, and in this case, the carry sheet glass may be separated from the display substrate by laser lift-off before step S6 is performed. Alternatively, the second flexible substrate may be formed on carry sheet glass, then step S4, step S5, step S1, and step S2 may be performed in sequence, the second flexible substrate may be disposed on a side of the bonding layer distal to the first flexible substrate, the carry sheet glass and the display substrate may be separated by laser lift-off, and then step S6 and step S7 may be performed.

In the display substrate fabricated by the fabricating method according to the embodiments of the present disclosure, the part of the second flexible substrate on which the display unit and the signal line are not disposed is not completely removed, so that the area of the bonding layer shielded by the second flexible substrate is increased, and the bonding layer is prevented from leaking into the gap between the display unit and the protection layer to cause bonding between the display unit and the protection layer in the process. Meanwhile, since the thickness of at least part of the second support part is smaller than that of the first support part, the stress concentration phenomenon generated on the second support part during a stretching process is effectively improved, so that the display substrate provided by the embodiments of the present disclosure still has good stretching performance.

In an embodiment, the second support part includes a first part and a second part, the first part is part of the second support part on which a signal line for connecting the plurality of display units are formed, and the second part is the other part than the first part of the second support part.

In some embodiments, before performing step S4, the above fabricating method further includes step S31.

At S31, a plurality of through holes penetrating through the second part are formed in the second part. In an embodiment, the plurality of through holes are arranged in an array; alternatively, the plurality of through holes are arranged in a first direction, and each through hole extends in a second direction intersecting with the first direction.

In some embodiments, the display unit includes a display area and a non-display area surrounding the display area, Before performing step S5, the above fabricating method further includes steps S41 and S42.

At S41, a retaining wall is formed on a side of the non-display area distal to the first flexible substrate, the retaining wall being a continuous structure surrounding the display area.

At S42, a packaging layer is formed on a side of the display area distal to the first flexible substrate, a side of the retaining wall distal to the first flexible substrate and a side of the second support layer distal to the first flexible substrate, and the thickness of the packaging layer is made smaller at the lower part of the side wall of the retaining wall than that at other positions.

In the display substrate fabricated by the fabricating method according to the embodiments of the present disclosure, the retaining wall is disposed on a side, distal to the first flexible substrate, of the non-display area surrounding the display area of the display unit, and when a part of the packaging layer covering the second support part generates a crack in a stretching process and the crack extends to the position of the packaging layer with a smaller thickness, the packaging layer at the position is broken, so that the extension of the crack is stopped at the position, which in turn prevent water vapor from permeating along the crack to cause a defect in a device in the display unit and affect the display effect of the display unit.

It is to be understood that the above implementations are merely exemplary implementations employed to explain the principles of the present disclosure, but the present disclosure is not limited thereto. Various modifications and improvements can be made by those skilled in the art without departing from the spirit and scope of the is present disclosure, and such modifications and improvements are also considered to be within the protection scope of the present disclosure.

What is claimed is:

1. A display substrate, comprising:
a first flexible substrate;
a second flexible substrate; and
a bonding layer between the first flexible substrate and the second flexible substrate and bonding the first flexible substrate and the second flexible substrate to each other;
wherein the second flexible substrate comprises a plurality of first support parts and a second support part spacing the plurality of first support parts apart from each other;
a plurality of display units are respectively disposed on a side of the plurality of first support parts distal to the first flexible substrate;
the second support part comprises a first part and a second part other than the first part;
a signal line configured to connect the plurality of display units is disposed on a side of the first part distal to the first flexible substrate; and
a thickness of the second part is smaller than a thickness of the first support part.

2. The display substrate of claim 1, wherein a thickness of the first part and the thickness of the second part are both smaller than the thickness of the first support part.

3. The display substrate of claim 1, wherein a thickness of the first part is 9 μm to 11 μm and the thickness of the second part is 1 μm to 2 μm.

4. The display substrate of claim 1, wherein a plurality of through holes are provided in the second part of the second support part.

5. The display substrate of claim 4, wherein the plurality of through holes are arranged in an array.

6. The display substrate of claim 4, wherein in the second support part between two adjacent display units, the plurality of through holes are arranged in a first direction, each of the plurality of through holes extends in a second direction intersecting with the first direction, and the first direction is a direction along which the two adjacent display units are arranged.

7. The display substrate of claim 4, wherein in the second support part between two adjacent display units, the plurality of through holes are arranged in a first direction, each of the plurality of through holes extends in a second direction intersecting with the first direction, and the second direction is a direction along which the two adjacent display units are arranged.

8. The display substrate of claim 1, wherein the display unit comprises a display area and a non-display area surrounding the display area; a retaining wall is disposed on the non-display area; and
a packaging layer is disposed on a side of the display unit and the second support part distal to the first flexible substrate; and the retaining wall is between the packaging layer and the display unit.

9. The display substrate of claim 8, wherein the retaining wall is a continuous structure surrounding the display area.

10. The display substrate of claim 8, wherein the packaging layer has a smaller thickness at a lower part of a side wall of the retaining wall than at other positions.

11. The display substrate of claim 8, wherein a width of the retaining wall gradually decreases in a direction approaching the first flexible substrate.

12. A display device, comprising the display substrate of claim 1.

13. A method for fabricating a display substrate, comprising:
providing a first flexible substrate;
forming a bonding layer on the first flexible substrate;
forming a second flexible substrate on the bonding layer; wherein the second flexible substrate comprises: a plurality of first support parts and a second support part spacing the plurality of first support parts apart from each other; and the second support part comprises a first part and a second part other than the first part; a thickness of the second part being smaller than a thickness of the first support part;
forming a plurality of display units respectively on a side of the plurality of first support parts distal to the first flexible substrate, and forming a signal line configured to connect the plurality of display units on a side of the first part of the second support part distal to the first flexible substrate;
forming a protection layer on a side of the plurality of display units distal to the first flexible substrate;
applying pressure to the first flexible substrate and/or the protection layer to cause the second flexible substrate to be integrally bonded with the first flexible substrate through the bonding layer; and
removing the protection layer to obtain the display substrate.

14. The method of claim 13, further comprising:
forming, in the second part of the second support part, a plurality of through holes penetrating through the second part.

15. The method of claim 13, wherein the display unit comprises a display area and a non-display area surrounding the display area; and the method further comprises steps of:
forming a retaining wall on a side of the non-display area distal to the first flexible substrate, the retaining wall being a continuous structure surrounding the display area; and
forming a packaging layer on a side of the display area distal to the first flexible substrate, a side of the retaining wall distal to the first flexible substrate and a side of the second support part distal to the first flexible substrate, and making a thickness of the packaging layer at a lower part of a side wall of the retaining wall smaller than a thickness of the packaging layer at other positions.

* * * * *